UNITED STATES PATENT OFFICE.

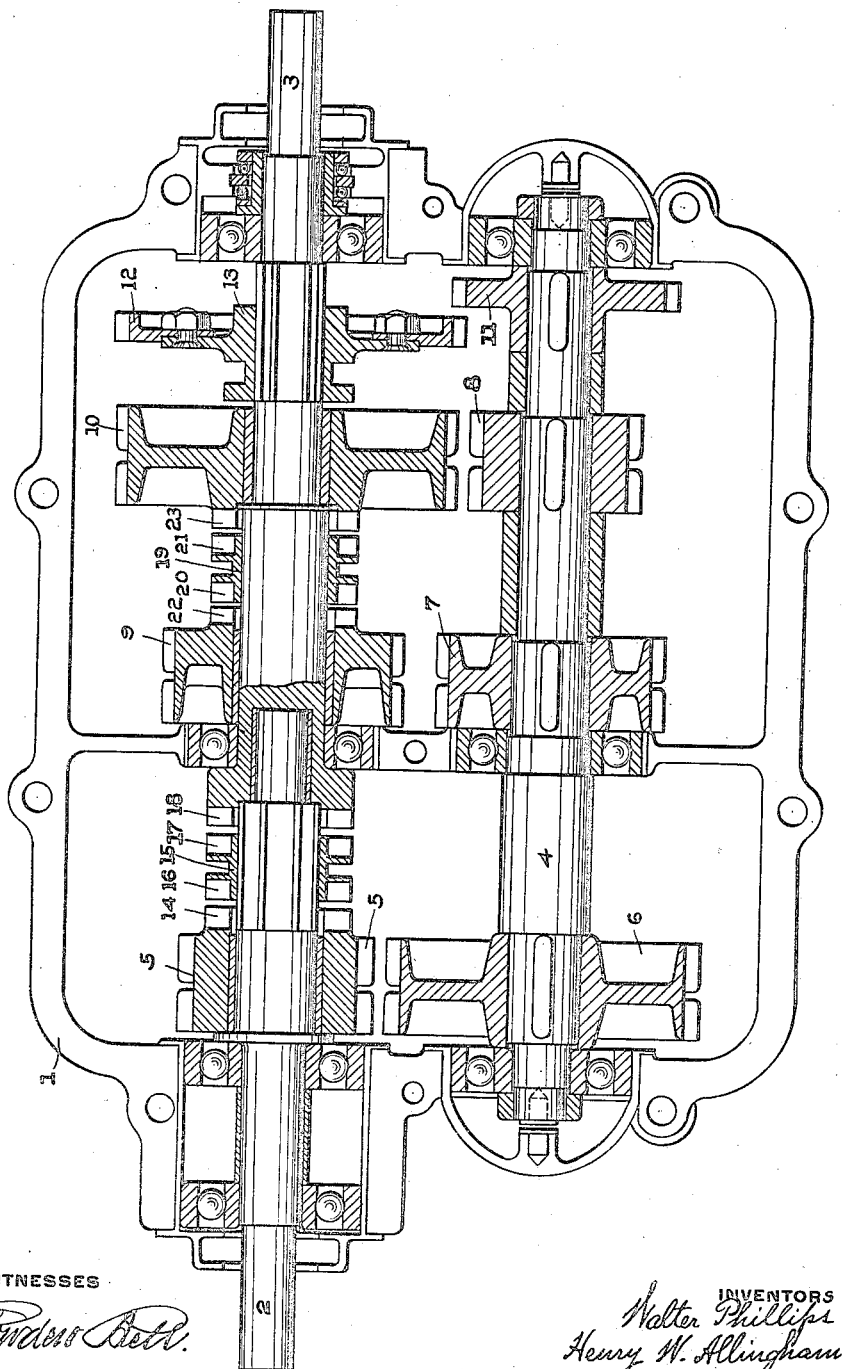

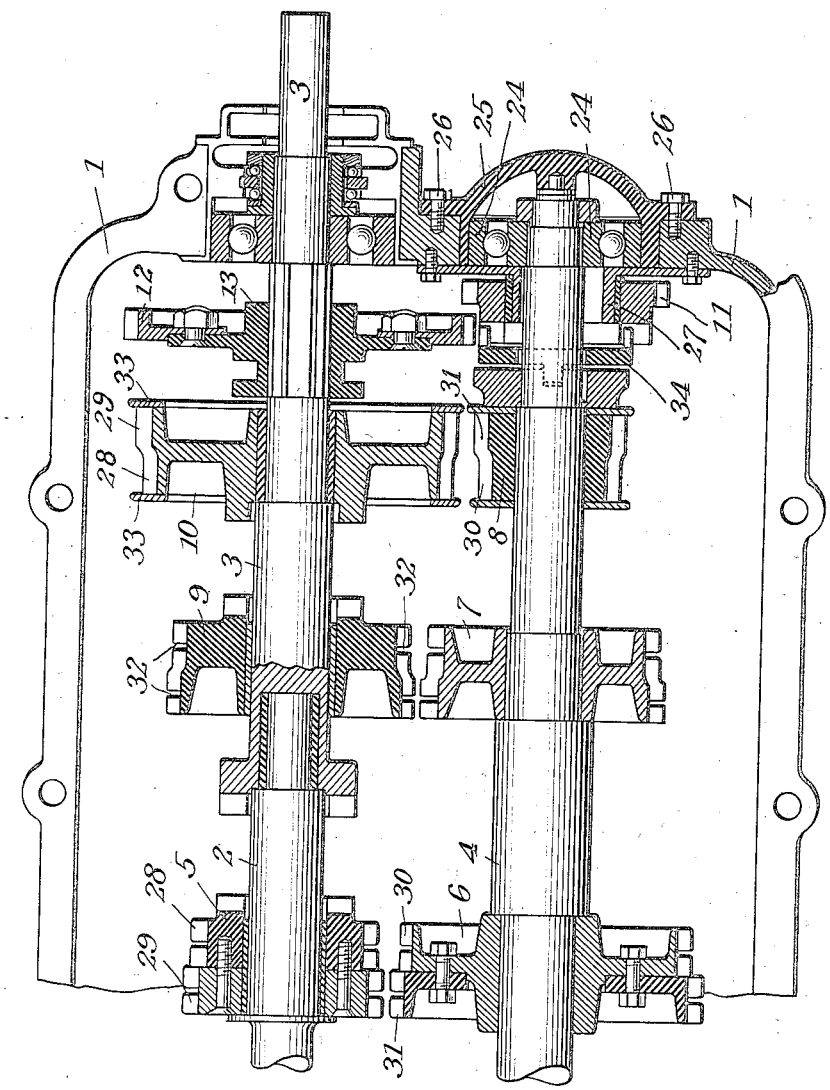

WALTER PHILLIPS AND HENRY W. ALLINGHAM, OF LONDON, ENGLAND, ASSIGNORS TO MORSE CHAIN COMPANY, OF ITHACA, NEW YORK, A CORPORATION OF NEW YORK.

CHANGE-SPEED GEARING.

1,225,851.

Specification of Letters Patent.     Patented May 15, 1917.

Application filed November 6, 1911. Serial No. 658,666.

*To all whom it may concern:*

Be it known that we, WALTER PHILLIPS, a citizen of the United States, and HENRY WILLIAM ALLINGHAM, a subject of the King of Great Britain, both residing in London, England, have invented a certain new and useful Improvement in Change-Speed Gearing, of which the following is a specification.

This invention relates to change speed gearing and has for its object to provide an improved arrangement of mechanism for transmitting power from the driving to the driven shaft.

In the case of self-propelled vehicles the mechanism necessary for obtaining variation in speed usually comprises a series of gear wheels mounted upon the driving and driven shaft respectively, and coöperating with a series of similar wheels mounted upon a lay shaft; the whole being located in a gear box.

It is usual to divide the gear wheels into separate pairs, one wheel of each pair—usually the wheel mounted upon the driving or driven shaft—being loosely mounted upon the said shaft under normal conditions and arranged to be brought into such a position as to be rotated by the shaft by means of suitable mechanism when desired.

In some cases intermeshing gear wheels are provided and it has also been proposed to transmit power from the driving to the driven shaft through the lay shaft before referred to by means of drive chains connecting each pair of gear wheels together.

A feature of the present invention consists in utilizing drive chains of this description and so arranging the gear wheels and the clutch mechanism in connection therewith that when the driving and driven shafts are directly connected, the other speed changing mechanism is thrown out of operation. By this means the wear upon the chains and also upon the teeth of the gear wheels is materially reduced, inasmuch as these wheels, and consequently the chains mounted thereon, are stationary when the driving and driven shafts are coupled together.

A further feature of the invention consists in a special construction of the gear wheels or of the bearings or shafts on which certain of the gear wheels are mounted, whereby a ready adjustment and compensation for the increase in the length of the chains, due to wear, may be obtained.

The invention is illustrated in the accompanying drawings, of which Figure 1 is a sectional plan view of one form of change speed gearing embodying the invention. Fig. 2 is a view similar to a portion of Fig. 1 but illustrating modified constructions of the gear wheels and bearings for one of the shafts, which may be employed.

Referring now to Fig. 1, the change speed gearing illustrated comprises a gear box or casing, 1, within which are located a driving shaft, 2, a driven shaft 3, and a lay shaft 4, the inner end of the shaft 2 being arranged to enter a socket in the inner end of the shaft 3, so that the driving and driven shafts are in alinement with one another. The lay shaft 4 is arranged parallel to the shafts 2 and 3, suitable ball bearings being provided for each of these shafts. Loosely mounted upon the end of the driving shaft 2 is a sprocket gear wheel 5 which may be of any usual construction and is connected by means of a chain, not shown, to a similar gear wheel 6 rigidly mounted upon the lay shaft 4. The latter has also rigidly secured thereto two other sprocket gear wheels, 7, 8, respectively, the sprocket gear wheels, 7, 8, being connected by means of chains, not shown, to corresponding gear wheels, 9, 10, respectively, loosely mounted upon the driven shaft 3. The lay shaft 4, also carries at its opposite end a gear wheel 11 adapted to engage directly with a gear wheel 12 mounted upon a sleeve 13 carried by the driven shaft 3, the sleeve 13 being adapted to slide longitudinally along the shaft 3 and to drive the latter by means of feathers and keyways on the shaft and gear wheel respectively. The gear wheel 5 is provided on its inner face with one element 14 of a clutch device, the other element of which is constituted by a bushing 15 provided with double clutch members 16, 17, on either face of the bushing respectively. The bushing 15 is adapted to slide longitudinally on the driving shaft 2 and to be driven by this shaft by means of one or more feathers thereon. The inner end of the driven shaft 3 is provided with similar clutch members 18 adapted to engage with the clutch members 17 when the bushing 15 is moved toward the right, so as to couple the driving and driven shafts 2, 3, mechanically together. The gear wheels, 9, 10, are adapted to be coupled to the driven shaft 3 by a similar clutch device comprising a bushing 19 provided with clutch members 20, 21 adapted to engage with similar clutch members 22, 23, attached to the gear wheels 9, 10, respectively.

The operation of this form of the gearing is as follows:—

When neither of the clutch devices 15, 19, is operative and the driving shaft 2 is being rotated, the driven shaft, 3, the lay shaft, 4, and all the gear wheels are stationary. When is is desired to drive the shaft 3 at its lowest speed the clutch bushing 15 is moved toward the left thereby causing the clutch members 14, 16 to engage with one another so that the gear wheel 5 is driven directly by the shaft 2. The gear wheel 5 by means of its chain gearing also drives the gear wheel 6 and the lay shaft 4 at a speed dependent upon the relative numbers of teeth on the wheels 5 and 6. The rotation of the lay shaft 4 is transmitted to the gear wheels 9 and 10 by means of their corresponding chain gearing, and if the clutch bushing 19 be moved toward the left so that the clutch members 20, 22 engage with one another the gear wheel 9 is coupled to the driven shaft 3 and drives the latter at a corresponding speed.

In order to increase the speed of rotation of the shaft 3 the clutch bushing 19 may be moved toward the right in which case the gear wheel 10 is coupled to the driven shaft 3 owing to the engagement of the clutch members 21 and 23, the gear wheel 9 in this case rotating loosely upon the driven shaft 3. In order to drive the shaft 3 at the same speed as the driving shaft 2, these two shafts may be directly coupled by restoring the clutch bushing 19 to its middle or inoperative position and moving the clutch bushing 15 toward the right so that the clutch members 17, 18, engage with one another and connect the shafts 2 and 3 directly together. Under these circumstances the lay shaft 4 and all the gear wheels are stationary.

In order to obtain a reversal in the direction of rotation of the driven shaft 3 the clutch bearing 15 should be moved toward the left so that the lay shaft 4 is driven from the driving shaft 2 and the bushing 13 carrying the gear wheel 12 is moved toward the right, so that the gear wheels 11, 12, are in engagement with one another.

Since these gear wheels are adapted to intermesh directly with each other the rotation of the shaft 3 produced thereby will evidently be opposite in direction to that produced by the chain-driven gear wheels.

In order to compensate for wear in the chains connecting the several pairs of gear wheels together the lay shaft 4 may be so supported that the distance between the axes of the shaft 4 and the shafts 2 and 3 may be adjusted. Such a construction is illustrated in Fig. 2, in which the bearings 24 of the lay shaft 4 are mounted eccentrically in caps 25 carried by the gear-box 1. As shown in the drawings the cap 25 is secured to the gear-box by means of bolts 26 adapted to enter holes in the gear-box, the adjustment of the position of the lay shaft 4 being effected by rotating the cap 25 before inserting the bolts 26. The method of effecting this adjustment will be clearly understood from a consideration of Fig. 2.

Since the adjustment above referred to necessarily varies the distance between the centers of the pair of intermeshing gearwheels, 11, 12, provided for obtaining a reversal in the direction of rotation of the driven shaft, 3, the teeth of the gear-wheels 11, 12, are preferably of involute form and of considerable length.

An additional arrangement is illustrated in Fig. 2, in which the gear wheel 11, instead of being directly mounted on the lay shaft 4 is mounted on a hollow boss or pivot 27 secured to the gear box, and is arranged to be driven by means of the lay shaft 4 through a universal joint or coupling 34, thus enabling the lay shaft 4 to be moved toward or away from the shafts 2 and 3 without varying the distance between the axes of the gear wheels 11 and 12.

In order to effect greater compensation than that above described for wear on the chains and consequently increasing their length, each pair of the gear wheels 5, 6, 7, 8, 9, and 10 respectively may be so constructed that a portion of the width of the wheel may be of greater diameter than other portions, each portion of the same wheel having, however, the same number of teeth. Such an arrangement is illustrated in Fig. 2, in which the gear wheels 5 and 6 are each divided into two portions 28, 29 and 30, 31 respectively. When a new chain is mounted on the gear wheels it is first placed on the portions 28, 30 of the gear wheels and as the length of the chain increases by a predetermined amount due to wear the chain is transferred to the portions 29, 31, of the gear wheel. It will be understood that the gradual increase in the length of the chain is compensated for by the adjustment of the shaft bearing as shown in Fig. 2 and that the transfer of the chain from the portion of the gear wheels 28, 30 to the portions 29, 31, need only be effected when the increase in length has become so great that the slack can no longer be taken up by the adjustment of the shaft bearing. Suitable guides may be provided for preventing the chain from riding up on the wheels, a groove being formed in the center of the teeth as shown at 32, on the gear wheel 9 in Fig. 2, the groove 32 serving to accommodate a projection or projections formed upon the chain. In cases in which the chain is not provided with such projections the gear wheels may be provided with lateral flanges 33 as shown on the gear wheel 10.

It will be understood that the invention is not limited in its application to self-propelled vehicles nor to any particular type of change speed gearing in which power is transmitted from the driving or driven shafts to the lay shaft by means of chain driven gear wheels, and that considerable modification from the constructions above described may be made without exceeding the scope of the invention.

Having now described our invention, what we claim as new, and desire to secure by Letters Patent is:

1. In a transmission mechanism, the combination with a driving shaft, a sprocket gear wheel loosely mounted thereon, a driven shaft in axial alinement therewith, and a loosely mounted sprocket gear wheel on said driven shaft, of a lay shaft, corresponding sprocket gear wheels rigidly mounted thereon, connections between said wheels on the driving and driven shafts and the gears on the lay shaft, clutch devices for the sprocket gears of the driving and driven shafts, a longitudinally adjustable reversing gear mounted on the driven shaft, and a corresponding gear mounted to turn with the lay shaft.

2. In a transmission mechanism, the combination of a driven shaft, a sprocket gear wheel mounted thereon, another shaft, a corresponding sprocket gear wheel thereon, a connection between said wheels, a pair of reversing gears mounted to turn with the respective shafts, a laterally adjustable bearing for one of the shafts, and a coupling between the adjustable shaft and its reversing gear.

3. In a transmission mechanism, the combination of a shaft having a laterally adjustable bearing, a sprocket gear mounted on said shaft, a gear mounted on a fixed bearing surrounding said shaft, and a driving connection between the shaft and the last mentioned gear.

4. In a transmission mechanism, the combination of a shaft having a laterally adjustable bearing, a sprocket gear mounted on said shaft, a gear mounted on a fixed bearing, and a flexible coupling between the shaft and said gear for driving the same.

5. In a change speed mechanism, the combination with a driving shaft, a loosely mounted sprocket gear thereon, a driven shaft mounted in axial alinement therewith, and a loosely mounted sprocket gear on said driven shaft, of a parallel lay shaft, laterally adjustable bearings for said lay shaft, rigidly mounted sprocket wheels on said lay shaft, connections between the corresponding sprocket gear wheels of the driving and driven shafts, and the gears on the lay shaft, clutch devices for said gears, a longitudinally adjustable reversing gear wheel mounted on the driven shaft, a corresponding gear wheel mounted on a fixed bearing surrounding the lay shaft, and a coupling between the lay shaft and the said gear wheel.

6. In a change speed mechanism, the combination with driving and driven shafts, and sprocket gear wheels mounted thereon, of a lay shaft, sprocket gear wheels mounted on said lay shaft, connections between the corresponding sprockets on said driving and driven shafts, and the gears on the lay shaft, said sprocket gear wheels being divided into a plurality of portions of different diameters as and for the purposes set forth.

WALTER PHILLIPS.
HENRY W. ALLINGHAM.